US012773622B2

(12) United States Patent
Fowler et al.

(10) Patent No.: US 12,773,622 B2
(45) Date of Patent: Oct. 27, 2026

(54) METHODS AND SYSTEMS FOR REAL-TIME ADAPTIVE STREAMING OF GAMING CONTENT IN AN ONLINE VIDEO GAME

(71) Applicant: Activision Publishing, Inc., Santa Monica, CA (US)

(72) Inventors: Chris Fowler, Gold Coast (AU); Andrew Glover, Sydney (AU)

(73) Assignee: Activision Publishing, Inc., Santa Monica, CA (US)

( * ) Notice: Subject to any disclaimer, the term of this patent is extended or adjusted under 35 U.S.C. 154(b) by 337 days.

(21) Appl. No.: 18/397,482

(22) Filed: Dec. 27, 2023

(65) Prior Publication Data

US 2024/0216799 A1 Jul. 4, 2024

Related U.S. Application Data

(60) Provisional application No. 63/477,897, filed on Dec. 30, 2022.

(51) Int. Cl.
*A63F 13/35* (2014.01)
*A63F 13/355* (2014.01)
*A63F 13/358* (2014.01)

(52) U.S. Cl.
CPC .......... *A63F 13/355* (2014.09); *A63F 13/358* (2014.09)

(58) Field of Classification Search
CPC ........ A63F 13/23; A63F 13/323; A63F 13/32; A63F 13/327; A63F 13/33; A63F 13/332;
(Continued)

(56) References Cited

U.S. PATENT DOCUMENTS 5,031,089 A 7/1991 Liu
5,442,569 A 8/1995 Osano
(Continued)

FOREIGN PATENT DOCUMENTS

AU 768367 3/2004
AU 2005215048 10/2011
(Continued)

OTHER PUBLICATIONS

Ma et al., "A Scalable Parallel Cell-Projection Volume Rendering Algorithm for Three-Dimensional Unstructured Data", IEEE 1997, pp. 1-10.

(Continued)

*Primary Examiner* — Omkar A Deodhar
(74) *Attorney, Agent, or Firm* — Novel IP

(57) ABSTRACT

Instead of simply downloading missing or required gaming content at a preset speed no matter the circumstance, a responsive or adaptive content streaming system and method first sets a content streaming speed and, if the download reaches that streaming speed, the speed is gradually increased while periodically checking for issues or problems related to the network connection used for streaming the gaming content. If issues or problems are not detected, the speed is continued to increase up to a predefined maximum speed. However, if one or more issue or problems are identified, then the speed is either incrementally throttled back or the streaming is completely stopped until there is stability of the network connection.

27 Claims, 3 Drawing Sheets

(58) Field of Classification Search
CPC ...... A63F 13/335; A63F 13/338; A63F 13/34; A63F 13/35; A63F 13/355; A63F 13/358; A63F 13/44; A63F 13/45; A63F 13/50; A63F 13/70; A63F 13/77; A63F 2300/209; A63F 2300/40; A63F 2300/407; A63F 2300/534; A63F 2300/535; A63F 2300/538; A63F 2300/552
See application file for complete search history.

(56) References Cited

U.S. PATENT DOCUMENTS

| | | | | |
|---|---|---|---|---|
| 5,530,796 | A | 6/1996 | Wang | |
| 5,535,276 | A | 7/1996 | Ganesan | |
| 5,539,883 | A | 7/1996 | Allon | |
| 5,561,736 | A | 10/1996 | Moore | |
| 5,563,946 | A | 10/1996 | Cooper | |
| 5,630,129 | A | 5/1997 | Wheat | |
| 5,685,775 | A | 11/1997 | Bakoglu | |
| 5,706,507 | A | 1/1998 | Schloss | |
| 5,708,764 | A | 1/1998 | Borrel | |
| 5,736,985 | A | 4/1998 | Lection | |
| 5,736,990 | A | 4/1998 | Barrus | |
| 5,737,416 | A | 4/1998 | Cooper | |
| 5,745,678 | A | 4/1998 | Herzberg | |
| 5,762,552 | A | 6/1998 | Vuong | |
| 5,768,511 | A | 6/1998 | Galvin | |
| 5,774,668 | A | 6/1998 | Choquier | |
| 5,796,393 | A | 8/1998 | Macnaughton | |
| 5,825,877 | A | 10/1998 | Dan | |
| 5,835,692 | A | 11/1998 | Cragun | |
| 5,860,137 | A | 1/1999 | Raz | |
| 5,875,296 | A | 2/1999 | Shi | |
| 5,878,233 | A | 3/1999 | Schloss | |
| 5,883,628 | A | 3/1999 | Mullaly | |
| 5,884,024 | A | 3/1999 | Lim | |
| 5,900,879 | A | 5/1999 | Berry | |
| 5,903,266 | A | 5/1999 | Berstis | |
| 5,903,271 | A | 5/1999 | Bardon | |
| 5,908,469 | A | 6/1999 | Botz | |
| 5,911,045 | A | 6/1999 | Leyba | |
| 5,920,325 | A | 7/1999 | Morgan | |
| 5,923,324 | A | 7/1999 | Berry | |
| 5,938,722 | A | 8/1999 | Johnson | |
| 5,944,824 | A | 8/1999 | He | |
| 5,963,915 | A | 10/1999 | Kirsch | |
| 5,969,724 | A | 10/1999 | Berry | |
| 5,977,979 | A | 11/1999 | Clough | |
| 5,990,888 | A | 11/1999 | Blades | |
| 6,008,848 | A | 12/1999 | Tiwari | |
| 6,009,455 | A | 12/1999 | Doyle | |
| 6,014,145 | A | 1/2000 | Bardon | |
| 6,021,268 | A | 2/2000 | Johnson | |
| 6,025,839 | A | 2/2000 | Schell | |
| 6,049,819 | A | 4/2000 | Buckle | |
| 6,058,266 | A | 5/2000 | Megiddo | |
| 6,059,842 | A | 5/2000 | Dumarot | |
| 6,069,632 | A | 5/2000 | Mullaly | |
| 6,081,270 | A | 6/2000 | Berry | |
| 6,081,271 | A | 6/2000 | Bardon | |
| 6,088,727 | A | 7/2000 | Hosokawa | |
| 6,091,410 | A | 7/2000 | Lection | |
| 6,094,196 | A | 7/2000 | Berry | |
| 6,098,056 | A | 8/2000 | Rusnak | |
| 6,101,538 | A | 8/2000 | Brown | |
| 6,104,406 | A | 8/2000 | Berry | |
| 6,111,581 | A | 8/2000 | Berry | |
| 6,134,588 | A | 10/2000 | Guenthner | |
| 6,141,699 | A | 10/2000 | Luzzi | |
| 6,144,381 | A | 11/2000 | Lection | |
| 6,148,328 | A | 11/2000 | Cuomo | |
| 6,179,713 | B1 | 1/2001 | James | |
| 6,185,614 | B1 | 2/2001 | Cuomo | |
| 6,201,881 | B1 | 3/2001 | Masuda | |
| 6,222,551 | B1 | 4/2001 | Schneider | |
| 6,271,842 | B1 | 8/2001 | Bardon | |
| 6,271,843 | B1 | 8/2001 | Lection | |
| 6,282,547 | B1 | 8/2001 | Hirsch | |
| 6,308,208 | B1 | 10/2001 | Jung | |
| 6,311,206 | B1 | 10/2001 | Malkin | |
| 6,314,465 | B1 | 11/2001 | Paul | |
| 6,330,281 | B1 | 12/2001 | Mann | |
| 6,334,141 | B1 | 12/2001 | Varma | |
| 6,336,134 | B1 | 1/2002 | Varma | |
| 6,337,700 | B1 | 1/2002 | Kinoe | |
| 6,345,287 | B1 | 2/2002 | Fong | |
| 6,349,091 | B1 | 2/2002 | Li | |
| 6,351,775 | B1 | 2/2002 | Yu | |
| 6,353,449 | B1 | 3/2002 | Gregg | |
| 6,356,297 | B1 | 3/2002 | Cheng | |
| 6,370,560 | B1 | 4/2002 | Robertazzi | |
| 6,393,467 | B1 | 5/2002 | Potvin | |
| 6,411,312 | B1 | 6/2002 | Sheppard | |
| 6,418,462 | B1 | 7/2002 | Xu | |
| 6,426,757 | B1 | 7/2002 | Smith | |
| 6,445,389 | B1 | 9/2002 | Bossen | |
| 6,452,593 | B1 | 9/2002 | Challener | |
| 6,462,760 | B1 | 10/2002 | Cox, Jr. | |
| 6,466,550 | B1 | 10/2002 | Foster | |
| 6,469,712 | B1 | 10/2002 | Hilpert, Jr. | |
| 6,473,085 | B1 | 10/2002 | Brock | |
| 6,473,597 | B1 | 10/2002 | Johnson | |
| 6,499,053 | B1 | 12/2002 | Marquette | |
| 6,505,208 | B1 | 1/2003 | Kanevsky | |
| 6,509,925 | B1 | 1/2003 | Dermler | |
| 6,525,731 | B1 | 2/2003 | Suits | |
| 6,539,415 | B1 | 3/2003 | Mercs | |
| 6,549,933 | B1 | 4/2003 | Barrett | |
| 6,567,109 | B1 | 5/2003 | Todd | |
| 6,567,813 | B1 | 5/2003 | Zhu | |
| 6,574,477 | B1 | 6/2003 | Rathunde | |
| 6,580,981 | B1 | 6/2003 | Masood | |
| 6,587,875 | B1 * | 7/2003 | Ogus | H04L 47/11 709/224 |
| 6,601,084 | B1 | 7/2003 | Bhaskaran | |
| 6,618,751 | B1 | 9/2003 | Challenger | |
| RE38,375 | E | 12/2003 | Herzberg | |
| 6,657,617 | B2 | 12/2003 | Paolini | |
| 6,657,642 | B1 | 12/2003 | Bardon | |
| 6,684,255 | B1 | 1/2004 | Martin | |
| 6,699,127 | B1 | 3/2004 | Lobb | |
| 6,717,600 | B2 | 4/2004 | Dutta | |
| 6,734,884 | B1 | 5/2004 | Berry | |
| 6,765,596 | B2 | 7/2004 | Lection | |
| 6,781,607 | B1 | 8/2004 | Benham | |
| 6,801,930 | B1 | 10/2004 | Dionne | |
| 6,819,669 | B2 | 11/2004 | Rooney | |
| 6,832,239 | B1 | 12/2004 | Kraft | |
| 6,836,480 | B2 | 12/2004 | Basso | |
| 6,845,389 | B1 * | 1/2005 | Sen | A63F 13/30 709/204 |
| 6,886,026 | B1 | 4/2005 | Hanson | |
| 6,941,236 | B2 | 9/2005 | Huelsbergen | |
| 6,948,168 | B1 | 9/2005 | Kuprionas | |
| RE38,865 | E | 11/2005 | Dumarot | |
| 6,970,929 | B2 | 11/2005 | Bae | |
| 6,993,596 | B2 | 1/2006 | Hinton | |
| 7,006,616 | B1 | 2/2006 | Christofferson | |
| 7,028,296 | B2 | 4/2006 | Irfan | |
| 7,062,533 | B2 | 6/2006 | Brown | |
| 7,089,266 | B2 | 8/2006 | Stolte | |
| 7,124,071 | B2 | 10/2006 | Rich | |
| 7,139,792 | B1 | 11/2006 | Mishra | |
| 7,143,409 | B2 | 11/2006 | Herrero | |
| 7,159,217 | B2 | 1/2007 | Pulsipher | |
| 7,185,067 | B1 | 2/2007 | Viswanath | |
| 7,209,137 | B2 | 4/2007 | Brokenshire | |
| 7,230,616 | B2 | 6/2007 | Taubin | |
| 7,249,123 | B2 | 7/2007 | Elder | |
| 7,263,511 | B2 | 8/2007 | Bodin | |
| 7,287,053 | B2 | 10/2007 | Bodin | |
| 7,305,438 | B2 | 12/2007 | Christensen | |
| 7,308,476 | B2 | 12/2007 | Mannaru | |

(56) References Cited

U.S. PATENT DOCUMENTS 7,353,295 B1 4/2008 Crow
7,404,149 B2 7/2008 Fox
7,426,538 B2 9/2008 Bodin
7,427,980 B1 9/2008 Partridge
7,428,588 B2 9/2008 Berstis
7,429,987 B2 9/2008 Leah
7,436,407 B2 10/2008 Doi
7,439,975 B2 10/2008 Hsu
7,443,393 B2 10/2008 Shen
7,447,996 B1 11/2008 Cox
7,467,180 B2 12/2008 Kaufman
7,467,181 B2 12/2008 McGowan
7,475,354 B2 1/2009 Guido
7,478,127 B2 1/2009 Creamer
7,484,012 B2 1/2009 Hinton
7,503,007 B2 3/2009 Goodman
7,506,264 B2 3/2009 Polan
7,515,136 B1 4/2009 Kanevsky
7,525,964 B2 4/2009 Astley
7,548,948 B2 6/2009 Klemets
7,552,177 B2 6/2009 Kessen
7,565,650 B2 7/2009 Bhogal
7,571,224 B2 8/2009 Childress
7,571,389 B2 8/2009 Broussard
7,580,888 B2 8/2009 Ur
7,590,984 B2 9/2009 Kaufman
7,596,596 B2 9/2009 Chen
7,640,587 B2 12/2009 Fox
7,667,701 B2 2/2010 Leah
7,698,656 B2 4/2010 Srivastava
7,702,784 B2 4/2010 Berstis
7,714,867 B2 5/2010 Doi
7,719,532 B2 5/2010 Schardt
7,719,535 B2 5/2010 Tadokoro
7,734,691 B2 6/2010 Creamer
7,737,969 B2 6/2010 Shen
7,743,095 B2 6/2010 Goldberg
7,747,679 B2 6/2010 Galvin
7,765,478 B2 7/2010 Reed
7,768,514 B2 8/2010 Pagan
7,773,087 B2 8/2010 Fowler
7,774,407 B2 8/2010 Daly
7,782,318 B2 8/2010 Shearer
7,792,263 B2 9/2010 D'Amora
7,792,801 B2 9/2010 Hamilton, II
7,796,128 B2 9/2010 Radzikowski
7,808,500 B2 10/2010 Shearer
7,814,152 B2 10/2010 McGowan
7,827,318 B2 11/2010 Hinton
7,843,471 B2 11/2010 Doan
7,844,663 B2 11/2010 Boutboul
7,847,799 B2 12/2010 Taubin
7,856,469 B2 12/2010 Chen
7,873,485 B2 1/2011 Castelli
7,882,222 B2 2/2011 Dolbier
7,882,243 B2 2/2011 Ivory
7,884,819 B2 2/2011 Kuesel
7,886,045 B2 2/2011 Bates
7,890,623 B2 2/2011 Bates
7,893,936 B2 2/2011 Shearer
7,904,829 B2 3/2011 Fox
7,921,128 B2 4/2011 Hamilton, II
7,940,265 B2 5/2011 Brown
7,945,620 B2 5/2011 Bou-Ghannam
7,945,802 B2 5/2011 Hamilton, II
7,970,837 B2 6/2011 Lyle
7,970,840 B2 6/2011 Cannon
7,985,138 B2 7/2011 Acharya
7,990,387 B2 8/2011 Hamilton, II
7,996,164 B2 8/2011 Hamilton, II
8,001,161 B2 8/2011 George
8,004,518 B2 8/2011 Fowler
8,005,025 B2 8/2011 Bodin
8,006,182 B2 8/2011 Bates
8,013,861 B2 9/2011 Hamilton, II
8,018,453 B2 9/2011 Fowler
8,018,462 B2 9/2011 Bhogal
8,019,797 B2 9/2011 Hamilton, II
8,019,858 B2 9/2011 Bauchot
8,022,948 B2 9/2011 Garbow
8,022,950 B2 9/2011 Brown
8,026,913 B2 9/2011 Garbow
8,028,021 B2 9/2011 Reisinger
8,028,022 B2 9/2011 Brownholtz
8,037,416 B2 10/2011 Bates
8,041,614 B2 10/2011 Bhogal
8,046,700 B2 10/2011 Bates
8,051,462 B2 11/2011 Hamilton, II
8,055,656 B2 11/2011 Cradick
8,056,121 B2 11/2011 Hamilton, II
8,057,307 B2 11/2011 Berstis
8,062,130 B2 11/2011 Smith
8,063,905 B2 11/2011 Brown
8,070,601 B2 12/2011 Acharya
8,082,245 B2 12/2011 Bates
8,085,267 B2 12/2011 Brown
8,089,481 B2 1/2012 Shearer
8,092,288 B2 1/2012 Theis
8,095,881 B2 1/2012 Reisinger
8,099,338 B2 1/2012 Betzler
8,099,668 B2 1/2012 Garbow
8,102,334 B2 1/2012 Brown
8,103,640 B2 1/2012 Lo
8,103,959 B2 1/2012 Cannon
8,105,165 B2 1/2012 Karstens
8,108,774 B2 1/2012 Finn
8,113,959 B2 2/2012 De Judicibus
8,117,551 B2 2/2012 Cheng
8,125,485 B2 2/2012 Brown
8,127,235 B2 2/2012 Haggar
8,127,236 B2 2/2012 Hamilton, II
8,128,487 B2 3/2012 Hamilton, II
8,131,740 B2 3/2012 Cradick
8,132,235 B2 3/2012 Bussani
8,134,560 B2 3/2012 Bates
8,139,060 B2 3/2012 Brown
8,139,780 B2 3/2012 Shearer
8,140,340 B2 3/2012 Bhogal
8,140,620 B2 3/2012 Creamer
8,140,978 B2 3/2012 Betzler
8,140,982 B2 3/2012 Hamilton, II
8,145,676 B2 3/2012 Bhogal
8,145,725 B2 3/2012 Dawson
8,149,241 B2 4/2012 Do
8,151,191 B2 4/2012 Nicol, II
8,156,184 B2 4/2012 Kurata
8,165,350 B2 4/2012 Fuhrmann
8,171,407 B2 5/2012 Huang
8,171,408 B2 5/2012 Dawson
8,171,559 B2 5/2012 Hamilton, II
8,174,541 B2 5/2012 Greene
8,174,970 B2 * 5/2012 Adamczyk ............ H04L 63/102
370/235
8,176,421 B2 5/2012 Dawson
8,176,422 B2 5/2012 Bergman
8,184,092 B2 5/2012 Cox
8,184,116 B2 5/2012 Finn
8,185,450 B2 5/2012 Mcvey
8,185,829 B2 5/2012 Cannon
8,187,067 B2 5/2012 Hamilton, II
8,199,145 B2 6/2012 Hamilton, II
8,203,561 B2 6/2012 Carter
8,214,335 B2 7/2012 Hamilton, II
8,214,433 B2 7/2012 Dawson
8,214,750 B2 7/2012 Hamilton, II
8,214,751 B2 7/2012 Dawson
8,217,953 B2 7/2012 Comparan
8,219,616 B2 7/2012 Dawson
8,230,045 B2 7/2012 Kawachiya
8,230,338 B2 7/2012 Dugan
8,233,005 B2 7/2012 Finn
8,234,234 B2 7/2012 Shearer
8,234,579 B2 7/2012 Do
8,239,775 B2 8/2012 Beverland

(56) References Cited

U.S. PATENT DOCUMENTS 8,241,131 B2 8/2012 Bhogal
8,245,241 B2 8/2012 Hamilton, II
8,245,283 B2 8/2012 Dawson
8,265,253 B2 9/2012 D'Amora
8,310,497 B2 11/2012 Comparan
8,334,871 B2 12/2012 Hamilton, II
8,360,886 B2 1/2013 Karstens
8,364,804 B2 1/2013 Childress
8,425,326 B2 4/2013 Chudley
8,442,946 B2 5/2013 Hamilton, II
8,506,372 B2 8/2013 Chudley
8,514,249 B2 8/2013 Hamilton, II
8,550,920 B1 10/2013 Allen
8,554,841 B2 10/2013 Kurata
8,607,142 B2 12/2013 Bergman
8,607,356 B2 12/2013 Hamilton, II
8,624,903 B2 1/2014 Hamilton, II
8,626,836 B2 1/2014 Dawson
8,692,835 B2 4/2014 Hamilton, II
8,721,412 B2 5/2014 Chudley
8,827,816 B2 9/2014 Bhogal
8,838,640 B2 9/2014 Bates
8,849,917 B2 9/2014 Dawson
8,856,650 B1 10/2014 Off
8,893,012 B1 11/2014 Zhang
8,911,296 B2 12/2014 Chudley
8,992,316 B2 3/2015 Smith
9,005,030 B2 4/2015 Laakkonen
9,005,036 B2 4/2015 Laakkonen
9,083,654 B2 7/2015 Dawson
9,152,914 B2 10/2015 Haggar
9,199,165 B2 12/2015 Zahn
9,205,328 B2 12/2015 Bansi
9,286,731 B2 3/2016 Hamilton, II
9,299,080 B2 3/2016 Dawson
9,364,746 B2 6/2016 Chudley
9,403,090 B2 8/2016 Harris
9,474,973 B2 10/2016 Perry
9,525,746 B2 12/2016 Bates
9,526,995 B2 12/2016 Brunstetter
9,583,109 B2 2/2017 Kurata
9,621,622 B2 4/2017 Ueda
9,630,097 B2 4/2017 Paradise
9,641,592 B2 5/2017 Thompson
9,682,324 B2 6/2017 Bansi
9,764,244 B2 9/2017 Bansi
9,789,406 B2 10/2017 Marr
9,808,722 B2 11/2017 Kawachiya
10,137,376 B2 11/2018 Kohler
10,223,449 B2 3/2019 Smith
10,226,703 B2 3/2019 De La Cruz
10,232,272 B2 3/2019 Marr
10,245,509 B2 4/2019 Marr
10,369,465 B2 * 8/2019 Perlman ................ H04L 67/131
10,376,781 B2 8/2019 Marr
10,898,813 B2 1/2021 Marr
10,905,963 B2 2/2021 Kohler
11,310,346 B2 4/2022 Marr
11,351,466 B2 6/2022 Condrey
11,439,909 B2 9/2022 De La Cruz
11,446,582 B2 9/2022 Kohler
11,648,470 B2 * 5/2023 Labate .................. A63F 13/358
463/42
11,679,333 B2 6/2023 Marr
12,023,593 B2 7/2024 De La Cruz
12,059,627 B2 8/2024 Condrey
12,161,940 B2 12/2024 Marr
2002/0007317 A1 1/2002 Callaghan
2002/0010776 A1 1/2002 Lerner
2002/0023159 A1 2/2002 Vange
2002/0056006 A1 5/2002 Vange
2002/0065870 A1 5/2002 Baehr-Jones
2002/0078192 A1 6/2002 Kopsell
2002/0107918 A1 8/2002 Shaffer
2002/0124137 A1 9/2002 Ulrich
2003/0008712 A1 1/2003 Poulin
2003/0037131 A1 2/2003 Verma
2003/0055892 A1 3/2003 Huitema
2003/0056002 A1 3/2003 Trethewey
2003/0084172 A1 5/2003 DeJong
2003/0084302 A1 5/2003 DeJong
2003/0110399 A1 6/2003 Rail
2003/0135621 A1 7/2003 Romagnoli
2003/0149781 A1 8/2003 Yared
2003/0163733 A1 8/2003 Barriga-Caceres
2003/0177187 A1 9/2003 Levine
2004/0014514 A1 1/2004 Yacenda
2004/0073773 A1 4/2004 Demjanenko
2004/0103079 A1 5/2004 Tokusho
2004/0210627 A1 10/2004 Kroening
2004/0228291 A1 11/2004 Huslak
2004/0244006 A1 12/2004 Kaufman
2005/0015571 A1 1/2005 Kaufman
2005/0246711 A1 11/2005 Berstis
2006/0059223 A1 3/2006 Klemets
2007/0060359 A1 3/2007 Smith
2007/0294089 A1 12/2007 Garbow
2008/0046956 A1 2/2008 Kulas
2008/0086459 A1 4/2008 Ryan
2008/0139301 A1 6/2008 Holthe
2008/0270605 A1 10/2008 Berstis
2008/0301405 A1 12/2008 Kaufman
2009/0082095 A1 3/2009 Walker
2009/0113448 A1 4/2009 Smith
2009/0131177 A1 5/2009 Pearce
2009/0147010 A1 6/2009 Russell
2009/0258708 A1 10/2009 Figueroa
2009/0298585 A1 12/2009 Cannon
2010/0153653 A1 6/2010 El-Mahdy
2010/0167816 A1 7/2010 Perlman
2011/0151971 A1 6/2011 Altshuler
2012/0100910 A1 4/2012 Eichorn
2012/0289346 A1 11/2012 Van Luchene
2014/0019862 A1 1/2014 Fink
2014/0031121 A1 1/2014 Kern
2014/0040496 A1 2/2014 Moorthy
2014/0194211 A1 7/2014 Chimes
2014/0221084 A1 8/2014 Morrison, III
2014/0235336 A1 8/2014 Morimoto
2014/0344725 A1 11/2014 Bates
2014/0370979 A1 12/2014 Zahn
2015/0141140 A1 5/2015 Lampe
2015/0224395 A1 8/2015 Trombetta
2015/0224399 A1 8/2015 Melo
2015/0224409 A1 8/2015 Hayashida
2015/0317945 A1 11/2015 Andress
2015/0375101 A1 12/2015 George
2015/0375102 A1 12/2015 George
2015/0379407 A1 12/2015 Woon
2016/0140637 A1 5/2016 Szabo
2016/0171835 A1 6/2016 Washington
2016/0180647 A1 6/2016 Webb
2016/0191671 A1 6/2016 Dawson
2016/0214012 A1 7/2016 Nishikawa
2016/0248676 A1 * 8/2016 Thanasekaran ....... G06F 3/0613
2017/0014718 A1 1/2017 Ceraldi
2017/0266550 A1 * 9/2017 Perlman .................. A63F 13/12
2018/0264359 A1 * 9/2018 Garbowski ........... A63F 13/358
2023/0026645 A1 1/2023 Kohler

FOREIGN PATENT DOCUMENTS

CA 2143874 6/2000
CA 2292678 7/2005
CA 2552135 7/2013
CN 1334650 A 2/2002
CN 1202652 C 10/2002
CN 1141641 C 3/2004
CN 1494679 A 5/2004
CN 1219384 9/2005
CN 1307544 3/2007
CN 100407675 7/2008
CN 100423016 C 10/2008
CN 100557637 11/2009

(56) References Cited

FOREIGN PATENT DOCUMENTS

| | | | |
|---|---|---|---|
| CN | 101001678 | B | 5/2010 |
| CN | 101436242 | | 12/2010 |
| CN | 101801482 | B | 12/2014 |
| EP | 668583 | | 8/1995 |
| EP | 0940960 | A1 | 9/1999 |
| EP | 0998091 | A2 | 5/2000 |
| EP | 1020804 | A2 | 7/2000 |
| EP | 0627728 | B1 | 9/2000 |
| EP | 1089516 | A2 | 4/2001 |
| EP | 0717337 | B1 | 8/2001 |
| EP | 1207694 | A2 | 5/2002 |
| EP | 0679977 | B1 | 10/2002 |
| EP | 0679978 | B1 | 3/2003 |
| EP | 0890924 | B1 | 9/2003 |
| EP | 1377902 | B1 | 8/2004 |
| EP | 0813132 | B1 | 1/2005 |
| EP | 1380133 | B1 | 3/2005 |
| EP | 1021021 | B1 | 9/2005 |
| EP | 0930584 | B1 | 10/2005 |
| EP | 0883087 | B1 | 8/2007 |
| EP | 1176828 | B1 | 10/2007 |
| EP | 2076888 | B1 | 7/2015 |
| GB | 2339938 | | 10/2002 |
| GB | 2352154 | | 7/2003 |
| JP | H1198134 | A | 4/1999 |
| JP | H11191097 | A | 4/1999 |
| JP | 11191097 | | 7/1999 |
| JP | 3033956 | B2 | 4/2000 |
| JP | 3124916 | B2 | 1/2001 |
| JP | 3177221 | B2 | 6/2001 |
| JP | 2001204973 | A | 7/2001 |
| JP | 3199231 | B2 | 8/2001 |
| JP | 3210558 | B2 | 9/2001 |
| JP | 3275935 | | 2/2002 |
| JP | 3361745 | | 1/2003 |
| JP | 3368188 | B2 | 1/2003 |
| JP | 3470955 | B | 9/2003 |
| JP | 3503774 | | 12/2003 |
| JP | 3575598 | | 7/2004 |
| JP | 3579823 | B | 7/2004 |
| JP | 3579154 | B2 | 10/2004 |
| JP | 3701773 | B2 | 10/2005 |
| JP | 3777161 | | 3/2006 |
| JP | 3914430 | B | 2/2007 |
| JP | 3942090 | B | 4/2007 |
| JP | 3962361 | | 5/2007 |
| JP | 4009235 | B | 9/2007 |
| JP | 4225376 | | 12/2008 |
| JP | 4653075 | | 12/2010 |
| JP | 5063698 | B | 8/2012 |
| JP | 5159375 | B2 | 3/2013 |
| JP | 5352200 | B2 | 11/2013 |
| JP | 5734566 | B2 | 6/2015 |
| KR | 20020038229 | A | 5/2002 |
| KR | 20030039019 | A | 5/2003 |
| MY | 117864 | A | 8/2004 |
| SG | 55396 | | 12/1998 |
| TW | 424213 | | 3/2001 |
| TW | 527825 | | 4/2003 |
| WO | 9642041 | A2 | 12/1996 |
| WO | 9900960 | A1 | 1/1999 |
| WO | 0203645 | A2 | 1/2002 |
| WO | 2002073457 | | 9/2002 |
| WO | 20020087156 | | 10/2002 |
| WO | 03049459 | A1 | 6/2003 |
| WO | 03058518 | A2 | 7/2003 |
| WO | 2004086212 | | 10/2004 |
| WO | 2005079538 | | 9/2005 |
| WO | 2007101785 | | 9/2007 |
| WO | 2008037599 | | 4/2008 |
| WO | 2008074627 | | 6/2008 |
| WO | 2008095767 | | 8/2008 |
| WO | 2009037257 | | 3/2009 |
| WO | 2009104564 | | 8/2009 |
| WO | 2010096738 | A1 | 8/2010 |

OTHER PUBLICATIONS

Hassen et al., "A Task-and Data-Parallel Programming Language Based on Shared Objects," ACM Transactions on Programming Languages and Systems, vol. 20, No. 6, Nov. 1998, pp. 1131-1170.

Kormann et al., "Risks of the Passport Single Signon Protocol" &It; 9th Intl. WWWW Conf., May 15, 2000.

Syverson, "Limitations on design principles for public key protocols", Proc. of 1996 IEEE Symposium on Security and Privacy, pp. 62-72, May 6, 1996.

Abadi et al., "Prudent Engineering Practice for Cryptogrphic Protocols", Proc. of 1994 IEEE Computer Society Symposium on Research in Security and Privacy, pp. 122-136, May 16, 1994.

EverQuest Wiki, "EverQuest Classes", Aug. 19, 2011, <http://everquest.wikia.com/wiki/Classes?oldid=3773>.

Planet Unreal, "Unreal Tournament Game Guide", game released Nov. 1999 with earliest article cmment on Sep. 6, 2007, IGN Entertainment, <http://planetunreal.gamespy.com/View.php?view=UTGameInfo.Detail&id=28&game=6><http://planetunreal.gamespy.com/View.php?view=UTGameInfo.Detail&id=1&game=6>.

IBM developer Works, OptimalGrid—autonomic computing on the Grid, James H. Kaufman; Tobin J. Lehman; Glenn Deen; and John Thomas, Jun. 2003.

IBM, Transcoding: Extending e-business to new environments, Britton et al., Sep. 22, 2000.

Duong et al; "A dynamic load sharing algorithm for massivly multiplayer online games" published Sep. 28, 2003-Oct. 1, 2003. http://ieeexplore.ieee.org/iel5/8945/28322/01266179.pdf?tp=&arnumber-=1266179&isnumber=28322http://ieeexplore.ieee.org/xpl/absprintf.jsp?arnumb- er=1266179.

"A multi-server architecture for distributed virtual walkthrough" http://delivery.acm.org/10.1145/590000/585768/p163-ng.pdf?key1=585768&key-2=0554824911&coll=GUIDE&dl=GUIDE&CFID=41712537&CFTOKEN=50783297. Nov. 11, 2002.

Mauve, M., Fischer, S., and Widmer, J. 2002. A generic proxy system for networked computer games. In Proceedings of the 1st Workshop on Network and System Support for Games (Braunschweig, Germany, Apr. 16-17, 2002). NetGames '02. ACM, New York, NY, 25-28. DOI'http://doi.acm.org/10.1145/566500.566504.

Lee et al., "A Self-Adjusting Data Distribution Mechanism for Multidimensional Load Balancing in Multiprocessor-Based Database Systems," Information Systems vol. 19, No. 7, pp. 549-567, 1994.

Feng et al., "A Parallel Hierarchical Radiosity Algorithm for Complex Scenes," Proceedings IEEE Symposium on Parallel Rendering (PRS) '97), IEEE Computer Society Technical Committee on Computer Graphics in cooperation with ACM SIGGRAPH pp. 71-79, 1997.

Andert, "A Simulation of Dynamic Task Allocation in a Distributed Computer System," Proceedings of the 1987 Winter Simulation Conference, 1987, pp. 1-9.

Derek Stanley, "What bitrate should I use when encoding my video? How do I optimize my video for the web?", Feb. 12, 2012, ezs3.com, <https://web.archive.Org/web/20120212171320/https://www.ezs3.com/public/What_bitrate_should_I_use_when_encoding_my_video_How_do_I_optimize_my_video_for_the_web.cfm> (Year: 2012).

International Search Report as Published as WO2005/079538 in corresponding international application No. PCT/US2005/005550. Jul. 5, 2006.

Surelya, "CS:Go Winter Update Adds Killer Replay", MMOs.com, published Dec. 13, 2015 retrieved from Internet URL <https://mmos.com/news/csgo-winter-update-adds-killer-replay>. (Year: 2015).

* cited by examiner

METHODS AND SYSTEMS FOR REAL-TIME ADAPTIVE STREAMING OF GAMING CONTENT IN AN ONLINE VIDEO GAME

CROSS-REFERENCE

The present application relies on U.S. Patent Provisional Application No. 63/477,897, titled "Methods and Systems for Real-Time Adaptive Streaming of Gaming Content in an Online Video Game" and filed on Dec. 30, 2022, for priority, which is herein incorporated by reference in its entirety.

FIELD

The present specification is related generally to the field of multiplayer online video games. More specifically, the present specification relates to improved systems and methods for dynamically adapting the streaming of gaming content in a multi-player online gaming system/environment.

BACKGROUND

Massively multiplayer online video games are responsible for a substantial share of the digital entertainment industry. By their very nature, multiplayer online video games allow many player computing devices to connect to at least one game server over a network. Since gaming content is provisioned by the at least one game server to multiple player computing devices over a network, a player's experience of the game is greatly dependent on the quality or stability of the network connection between the player computing device and the at least one game server. Consequently, it is desirable to manage delivery of gaming content in a way that is responsive to the variability of quality or stability of the network connection across geographical locations.

Accordingly, there is a need for improved systems and methods that enable real-time modulation of one or more parameters of streaming gaming content in response to the variability of the quality or stability of a network connection between a gaming server and a player's client device in a multiplayer online video game environment.

SUMMARY

The following embodiments and aspects thereof are described and illustrated in conjunction with systems, tools and methods, which are meant to be exemplary and illustrative, and not limiting in scope. The present application discloses numerous embodiments.

The present specification discloses a computer-implemented method for dynamically adapting a streaming of content during a video gameplay session in a multi-player gaming network, wherein the multi-player gaming network comprises at least one host computer and a plurality of client devices in data communication and located remote from each other, wherein each of the plurality of client devices is configured to execute the video gameplay session, and wherein a first game module is configured to execute in the at least one host computer and a second game module is configured to execute in each of the plurality of client devices, the method being executed by the first and second game modules and comprising: transmitting, by the second game module of one of the plurality of client devices to the first game module, a request to download the content during the gameplay session, wherein a maximum streaming speed is associated with the content; streaming, by the first game module to the second game module in response to the request, the content at a streaming speed that is less than the maximum streaming speed, wherein the content is streamed for a predefined threshold time duration; determining, by the first game module at an end of the predefined threshold time duration, a first level of stability of a network connection between the first and second game modules, wherein the first level of stability is determined based on at least a first connection parameter, a second connection parameter or a third connection parameter; and increasing the streaming speed, by the first game module if the network connection is determined to be stable, in a plurality of incremental value steps until the maximum streaming speed is achieved, wherein each of the plurality of incremental value steps increases the streaming speed by a predefined amount.

Optionally, the method of further comprises: decreasing the streaming speed, by the first game module if the network connection is determined to have a first level of instability, in a plurality of decrementing value steps until the network connection is determined to be stable, wherein each of the plurality of decrementing value steps decreases the streaming speed and wherein a consecutive next of the plurality of steps is implemented only if the network connection is determined to have the first level of instability at an end of the predefined threshold time duration of an immediate previous of the plurality of steps.

Optionally, the method further comprises: stopping streaming of the content, by the first game module if the network connection is determined to have a second level of instability, for a predetermined cooling time period; determining, by the first game module at an end of the predefined cooling time period and over a predetermined evaluation time period, a second level of stability of the network connection based on at least one of the first connection parameter or second connection parameter; and restarting streaming of the content, by the first game module, if the network connection is determined to have the second level of stability at the end of the predetermined evaluation time period, wherein streaming of the content is restarted at the streaming speed and the maximum streaming speed.

Optionally, the streaming speed is 128 kbps, and the maximum streaming speed is 1500 kbps.

Optionally, the predefined threshold time duration is 500 milliseconds.

Optionally, the first connection parameter is indicative of a ping time, the second connection parameter is indicative of a packet loss and the third connection parameter is indicative of an amount of the content downloaded in the second game module.

Optionally, the network connection is determined to have the first level of stability if the first connection parameter is less than a predetermined threshold ping time, the second connection parameter is less than a predetermined threshold packet loss and the third connection parameter is substantially equal to an amount of the content streamed by the first game module at the streaming speed during the predefined threshold time duration.

Optionally, the network connection is determined to have the second level of stability if the first connection parameter is less than a predetermined threshold ping time and the second connection parameter is less than a predetermined threshold packet loss.

Optionally, the network connection is determined to have the first level of instability if the first connection parameter increases more than a predetermined threshold ping time but does not increase by more than 15% of the predetermined threshold ping time, the second connection parameter increases more than a predetermined threshold packet loss but does not increase by more than 15% of the predetermined threshold packet loss and the third connection parameter is substantially less than an amount of the content streamed by the first game module at the streaming speed during the predefined threshold time duration.

Optionally, the network connection is determined to have the second level of instability if the first connection parameter increases more than 15% of the predetermined threshold ping time, and the second connection parameter increases more than 15% of the predetermined threshold packet loss.

Optionally, while increasing the streaming speed, periodically determining, by the first game module a second level of stability of the network connection between the first and second game modules, wherein the second level of stability is determined based on at least the first connection parameter, the second connection parameter or the third connection parameter.

Optionally, the predetermined threshold ping time is 50 milliseconds and the predetermined threshold packet loss is 1%.

The present specification also discloses a computer readable non-transitory medium comprising a plurality of executable programmatic instructions wherein, when said plurality of executable programmatic instructions are executed by a processor in a computing device, a process for dynamically adapting streaming of content during a video gameplay session in a multi-player gaming network is executed, wherein the process for dynamically adapting streaming of content is executed at least partially by at least one host computer in data communication with a plurality of remotely located client devices, the plurality of executable programmatic instructions comprising: transmitting, by one of the plurality of client devices to the at least one host computer, a request to download the content during the gameplay session; streaming, by the at least one host computer to said one of the plurality of client devices, the content at a streaming speed and an associated maximum streaming speed, wherein the content is streamed for a predefined threshold time duration; determining, by the at least one host computer at an end of the predefined threshold time duration, a first level of stability of a network connection between the at least one host computer and said one of the plurality of client devices on the multi-player gaming network, wherein the first level of stability is determined based on first, second and third connection parameters; and increasing the streaming speed, by the at least one host computer if the network connection is determined to be stable, in a plurality of steps of a predetermined incremental speed value till the maximum streaming speed is achieved, wherein each of the plurality of steps has a corresponding increased streaming speed at which the content is streamed for the predefined threshold time duration, and wherein a consecutive next of the plurality of steps is implemented only if the network connection is determined to be stable at an end of the predefined threshold time duration of an immediate previous of the plurality of steps.

Optionally, the plurality of executable programmatic instructions further comprises: decreasing the streaming speed, by the at least one host computer if the network connection is determined to have a first level of instability, in a plurality of steps of a predetermined decrement speed value till the network connection is determined to be stable, wherein each of the plurality of steps has a corresponding decreased streaming speed at which the content is streamed for the predefined threshold time duration, and wherein a consecutive next of the plurality of steps is implemented only if the network connection is determined to have the first level of instability at an end of the predefined threshold time duration of an immediate previous of the plurality of steps.

Optionally, the plurality of executable programmatic instructions further comprises: stopping streaming of the content, by the at least one host computer if the network connection is determined to have a second level of instability, for a predetermined cooling time period; determining, by the at least one host computer at an end of the predefined cooling time period and over a predetermined evaluation time period, a second level of stability of the network connection based on the first and second connection parameters; and restarting streaming of the content, by the at least one host computer, if the network connection is determined to have the second level of stability at the end of the predetermined evaluation time period, wherein streaming of the content is restarted at the streaming speed and the maximum streaming speed.

Optionally, the streaming speed is 128 kbps, and the maximum streaming speed is 1500 kbps.

Optionally, the predefined threshold time duration is 500 milliseconds.

Optionally, the first connection parameter is indicative of a ping time, the second connection parameter is indicative of a packet loss and the third connection parameter is indicative of an amount of the content downloaded in the second game module.

Optionally, the network connection is determined to have the first level of stability if the first connection parameter is less than a predetermined threshold ping time, the second connection parameter is less than a predetermined threshold packet loss and the third connection parameter is substantially equal to an amount of the content streamed by the first game module at the streaming speed during the predefined threshold time duration.

Optionally, the network connection is determined to have the second level of stability if the first connection parameter is less than a predetermined threshold ping time and the second connection parameter is less than a predetermined threshold packet loss.

Optionally, the network connection is determined to have the first level of instability if the first connection parameter increases more than a predetermined threshold ping time but does not increase by more than 15% of the predetermined threshold ping time, the second connection parameter increases more than a predetermined threshold packet loss but does not increase by more than 15% of the predetermined threshold packet loss and the third connection parameter is substantially less than an amount of the content streamed by the first game module at the streaming speed during the predefined threshold time duration.

Optionally, the network connection is determined to have the second level of instability if the first connection parameter increases more than 15% of the predetermined threshold ping time, and the second connection parameter increases more than 15% of the predetermined threshold packet loss.

The present specification also discloses a computer-implemented method for dynamically adapting streaming of content during a video gameplay session in a multi-player gaming network, wherein the multi-player gaming network comprises at least one host computer and a plurality of client devices in data communication and located remote from each other, wherein each of the plurality of client devices is configured to execute the video gameplay session, and wherein a first game module is stored in the at least one host computer and a second game module is stored in each of the plurality of client devices, the method being executed by the first and second game modules and comprising: transmitting, by the second game module of one of the plurality of client devices to the first game module, a request to download the content during the gameplay session; streaming, by the first game module to the second game module in response to the request, the content at a streaming speed and an associated maximum streaming speed, wherein the content is streamed for a predefined threshold time duration; determining, by the first game module at an end of the predefined threshold time duration, a first level of stability of a network connection between the first and second game modules on the multi-player gaming network, wherein the first level of stability is determined based on first, second and third connection parameters; increasing the streaming speed, by the first game module if the network connection is determined to be stable, in a plurality of steps of a predetermined incremental speed value till the maximum streaming speed is achieved, wherein each of the plurality of steps has a corresponding increased streaming speed at which the content is streamed for the predefined threshold time duration, and wherein a consecutive next of the plurality of steps is implemented only if the network connection is determined to be stable at an end of the predefined threshold time duration of an immediate previous of the plurality of steps; decreasing the streaming speed, by the first game module if the network connection is determined to have a first level of instability, in a plurality of steps of a predetermined decrement speed value till the network connection is determined to be stable, wherein each of the plurality of steps has a corresponding decreased streaming speed at which the content is streamed for the predefined threshold time duration, and wherein a consecutive next of the plurality of steps is implemented only if the network connection is determined to have the first level of instability at an end of the predefined threshold time duration of an immediate previous of the plurality of steps; stopping streaming of the content, by the first game module if the network connection is determined to have a second level of instability, for a predetermined cooling time period; determining, by the first game module at an end of the predefined cooling time period and over a predetermined evaluation time period, a second level of stability of the network connection based on the first and second connection parameters; and restarting streaming of the content, by the first game module, if the network connection is determined to have the second level of stability at the end of the predetermined evaluation time period, wherein streaming of the content is restarted at the streaming speed and the maximum streaming speed.

Optionally, the streaming speed is 128 kbps, and the maximum streaming speed is 1500 kbps.

Optionally, the predefined threshold time duration is 500 milliseconds.

Optionally, the first connection parameter is indicative of a ping time, the second connection parameter is indicative of a packet loss and the third connection parameter is indicative of an amount of the content downloaded in the second game module.

Optionally, the network connection is determined to have the first level of stability if the first connection parameter is less than a predetermined threshold ping time, the second connection parameter is less than a predetermined threshold packet loss and the third connection parameter is substantially equal to an amount of the content streamed by the first game module at the streaming speed during the predefined threshold time duration.

Optionally, the network connection is determined to have the second level of stability if the first connection parameter is less than a predetermined threshold ping time and the second connection parameter is less than a predetermined threshold packet loss.

Optionally, the network connection is determined to have the first level of instability if the first connection parameter increases more than a predetermined threshold ping time but does not increase by more than 15% of the predetermined threshold ping time, the second connection parameter increases more than a predetermined threshold packet loss but does not increase by more than 15% of the predetermined threshold packet loss and the third connection parameter is substantially less than an amount of the content streamed by the first game module at the streaming speed during the predefined threshold time duration.

Optionally, the network connection is determined to have the second level of instability if the first connection parameter increases more than 15% of the predetermined threshold ping time, and the second connection parameter increases more than 15% of the predetermined threshold packet loss.

Optionally, the predetermined threshold ping time is 50 milliseconds and the predetermined threshold packet loss is 1%.

The aforementioned and other embodiments of the present specification shall be described in greater depth in the drawings and detailed description provided below.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g., boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another and vice versa. Furthermore, elements may not be drawn to scale. Non-limiting and non-exhaustive descriptions are described with reference to the following drawings. The components in the figures are not necessarily to scale, emphasis instead being placed upon illustrating principles.

DETAILED DESCRIPTION

Figure 1:
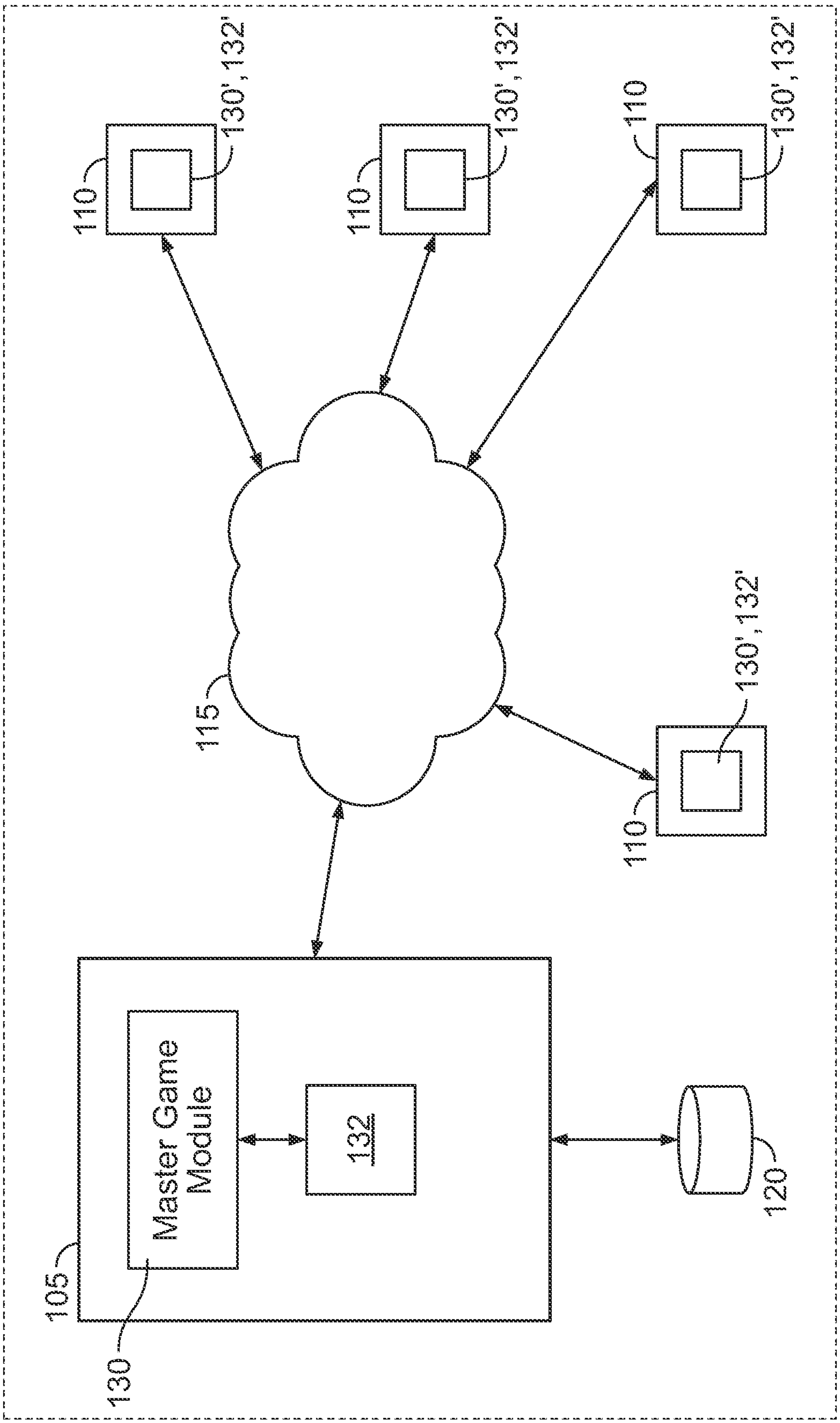
FIG. 1 is a block diagram showing a client-server architecture in which systems and methods of the present specification may be implemented, in accordance with some embodiments; and, FIG. 2 is a flowchart showing a plurality of exemplary steps of a method of implementing adaptive or responsive streaming of gaming content in a multi-player online gaming or massively multiplayer online gaming system/environment, in accordance with some embodiments of the present specification.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phrascology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The term "a multi-player online gaming environment" or "massively multiplayer online game" may be construed to mean a specific hardware architecture in which one or more servers electronically communicate with, and concurrently support game interactions with, a plurality of client devices, thereby enabling each of the client devices to simultaneously play in the same instance of the same game. Preferably the plurality of client devices number in the dozens, preferably hundreds, preferably thousands. In one embodiment, the number of concurrently supported client devices ranges from 10 to 5,000,000 and every whole number increment or range therein. Accordingly, a multi-player gaming environment or massively multi-player online game is a computer-related technology, a non-generic technological environment, and should not be abstractly considered a generic method of organizing human activity divorced from its specific technology environment.

In various embodiments, a computing device includes an input/output controller, at least one communications interface and system memory. The system memory includes at least one random access memory (RAM) and at least one read-only memory (ROM). These elements are in communication with a central processing unit (CPU) to enable operation of the computing device. In various embodiments, the computing device may be a conventional standalone computer or alternatively, the functions of the computing device may be distributed across multiple computer systems and architectures.

In some embodiments, execution of a plurality of sequences of programmatic instructions or code configure, enable, or cause the CPU of the computing device to perform various functions and processes. In alternate embodiments, hard-wired circuitry may be used in place of, or in combination with, software instructions for implementation of the processes of systems and methods described in this application. Thus, the systems and methods described are not limited to any specific combination of hardware and software.

The term "module", "application" or "engine" used in this disclosure may refer to computer logic utilized to provide a desired functionality, service or operation by programming or controlling a general purpose processor. Stated differently, in some embodiments, a module, application or engine implements a plurality of instructions or programmatic code to cause a general purpose processor to perform one or more functions. In various embodiments, a module, application or engine can be implemented in hardware, firmware, software or any combination thereof. The module, application or engine may be interchangeably used with unit, logic, logical block, component, or circuit, for example. The module, application or engine may be the minimum unit, or part thereof, which performs one or more particular functions.

The term "gaming content" used in this specification may refer to a game's audio-visual content or media, including the visual appearances of its characters, and corresponding in-game data that is rendered and made available to users or viewers of the game. Thus, "gaming content" includes data indicative of textures, non-player characters (NPCs), as well as content such as in-game sounds and videos. "Textures" may refer to the actual colors and minute details that are used to enable gaming landscapes and items. In some embodiments, "textures" are images that are used in 3D games to render 3D objects, 2D planes in 3D space, or other graphical user interface elements)

In the description and claims of the application, each of the words "comprise", "include", "have", "contain", and forms thereof, are not necessarily limited to members in a list with which the words may be associated. Thus, they are intended to be equivalent in meaning and be open-ended in that an item or items following any one of these words is not meant to be an exhaustive listing of such item or items, or meant to be limited to only the listed item or items. It should be noted herein that any feature or component described in association with a specific embodiment may be used and implemented with any other embodiment unless clearly indicated otherwise.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present disclosure, the preferred, systems and methods are now described.

Overview

FIG. 1 illustrates an embodiment of a multi-player online gaming or massively multiplayer online gaming system/environment 100 in which the systems and methods of the present specification may be implemented or executed. The system 100 comprises client-server architecture, where one or more game servers 105 (also referred to as 'host computers') are configured to be in communication with one or more client devices 110 over a network 115. Players and non-players, such as an administrator, may access the system 100 via the one or more client devices 110. The client devices 110 comprise computing devices such as, but not limited to, personal or desktop computers, laptops, Netbooks, handheld devices such as smartphones, tablets, and PDAs, gaming consoles and/or any other computing platform known to persons of ordinary skill in the art. Although four client devices 110 are illustrated in FIG. 1, any number of client devices 110 can be in communication with the one or more game servers 105 over the network 115.

The one or more game servers 105 may be any computing device having one or more processors and one or more computer-readable storage media such as RAM, hard disk, or any other optical or magnetic media. The one or more game servers 105 include a plurality of modules operating to provide or implement a plurality of functional, operational, or service-oriented methods of the present specification. In some embodiments, the one or more game servers 105 include or are in communication with at least one database system 120. The database system 120 stores a plurality of game data associated with at least one game that is served or provided to the client devices 110 over the network 115. In some embodiments, the one or more game servers 105 may be implemented by a cloud of computing platforms operating together as game servers 105.

In accordance with aspects of the present specification, the one or more game servers 105 are configured to provide or implement a plurality of modules or engines such as, but not limited to, a master game module or engine 130 and an adaptive content streaming (ACS) module or engine 132. In some embodiments, the one or more client devices 110 are configured to implement or execute one or more of a plurality of client-side modules some of which may be the same as or similar to the modules of the one or more game servers 105. For example, in some embodiments each of the player and non-player client devices 110 is configured to execute a client-side game module, engine or application 130' (also referred to as—client game module 130') that integrates a client-side ACS module, engine or application 132'. Stated differently, in some embodiments, the functionalities of the ACS module 132 is at least partially integrated in and executed by the client-side game module 130' in data communication with the one or more game servers 105.

While various aspects of the present specification are being described with reference to functionalities or programming distributed across multiple modules or engines 130, 130' and 132, 132', it should be appreciated that, in some embodiments, some or all of the functionalities or programming associated with these modules or engines may be integrated within fewer modules or in a single module—such as, for example, in the master game module 130 itself on the server side and in the client gaming module 130' on the client side. It should also be noted that the computing devices, servers, and/or modules described herein are configured to perform various functions and execute various programs in accordance with the requirements of the present specification.

In embodiments, the master game module 130 is configured to execute an instance of an online game to facilitate interaction of the players with and within the game. In embodiments, the instance of the game executed may be synchronous, asynchronous, and/or semi-synchronous. The master game module 130 is configured to control aspects of the game for all players and receives and processes each player's input in the game. In other words, the master game module 130 is configured to host the online game for all players, receive game data from the client devices 110 and transmit updates to all client devices 110 based on the received game data so that the game, on each of the client devices 110, represents the most updated or current status with reference to interactions of all players with the game. Thus, the master game module 130 is configured to transmit game data over the network 115 to the client devices 110 for use and rendering by the game module 130' to provide local versions and current status of the game to the players.

On the client-side, each of the one or more player client devices 110 is configured to implement the game module 130' such that it operates as a gaming application to provide a player with an interface between the player and the game. The game module 130' is configured to generate the interface to render a virtual environment, virtual space, or virtual world associated with the game and enables the player to interact in the virtual environment to perform a plurality of game and other tasks and objectives. The game module 130' is configured to access game data received from the game server 105 to provide an accurate representation of the game to the player. The game module 130' is also configured to capture and process player inputs and interactions within the virtual world or environment and provide updates to the game server 110 over the network 115.

The database system 120 described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database system 120 may comprise one or more such databases that reside in one or more physical devices and in one or more physical locations.

In accordance with some aspects of the present specification, the client-side ACS module 132' is configured to download gaming content in real-time as a player moves through the game (that is, during gameplay). Consequently, the server-side ACS module 132 is configured to stream the gaming content in real-time as and when desired or requested by the client-side ACS module 132' during gameplay. In an embodiment, the streaming of the gaming content in considered "on-demand" when a player encounters a texture that they have not yet downloaded but wish to display it. The player will queue downloading the texture. This avoids the need to download large amounts of data indicative of gaming content upfront into a client device 110. Operationally, the client-side ACS module 132', in data communication with the server-side ACS module 132, is configured to detect whether a specific portion of data indicative of gaming content has been stripped or removed from the initial download as a player reaches that portion of the game and, in real-time, downloads the missing texture or content. In some embodiments, a standard base game package, provided to the player at the time of initial download, is stripped out of the gaming content that is downloaded in real-time so that the base game package (for initial download) is smaller. In embodiments, players may select which components of the standard base game package they wish to install.

Adaptive Content Streaming (ACS) Modules 132, 132'

In accordance with aspects of the present specification, the server-side ACS module 132 is configured to implement a plurality of instructions or programmatic code to, dynamically or in real-time, adapt or modulate streaming of gaming content to the client-side player ACS module 132' based on a continued assessment of the quality or stability of the connection of the network 110.

In various embodiments, instead of simply downloading missing gaming content at a preset speed regardless of the circumstance, the present specification is directed towards a more responsive or adaptive content streaming system that sets an initial content streaming speed and, if the download reaches that streaming speed, the system gradually increases the speed while periodically checking for issues or problems related to the network connection used for streaming the gaming content. If the system does not identify any issues or problems, it is configured to gradually increase the speed. However, if the system does identify one or more issue or problems, the system incrementally throttles the speed back until there is stability of the network connection.

Figure 2:
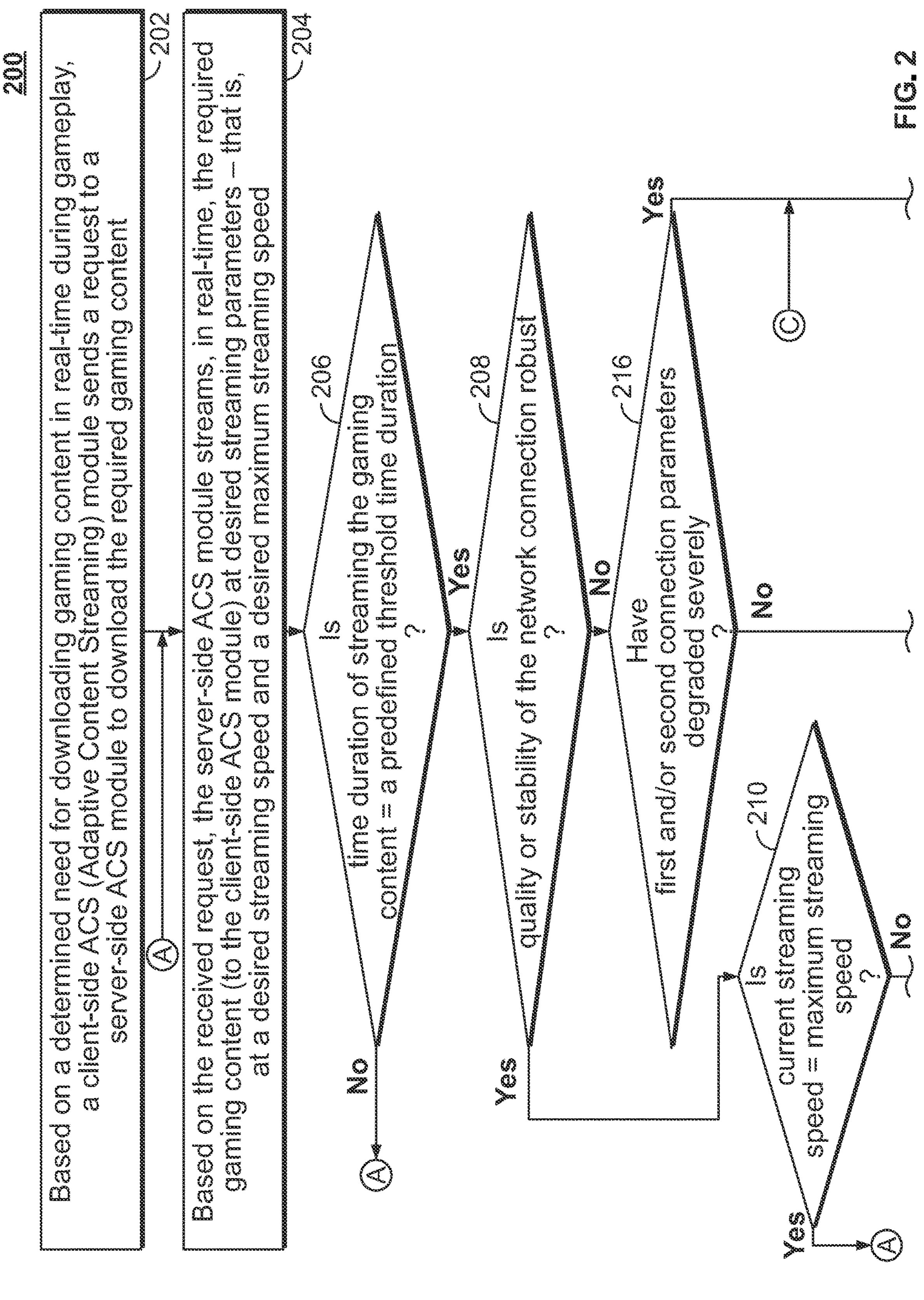
Figure 2:
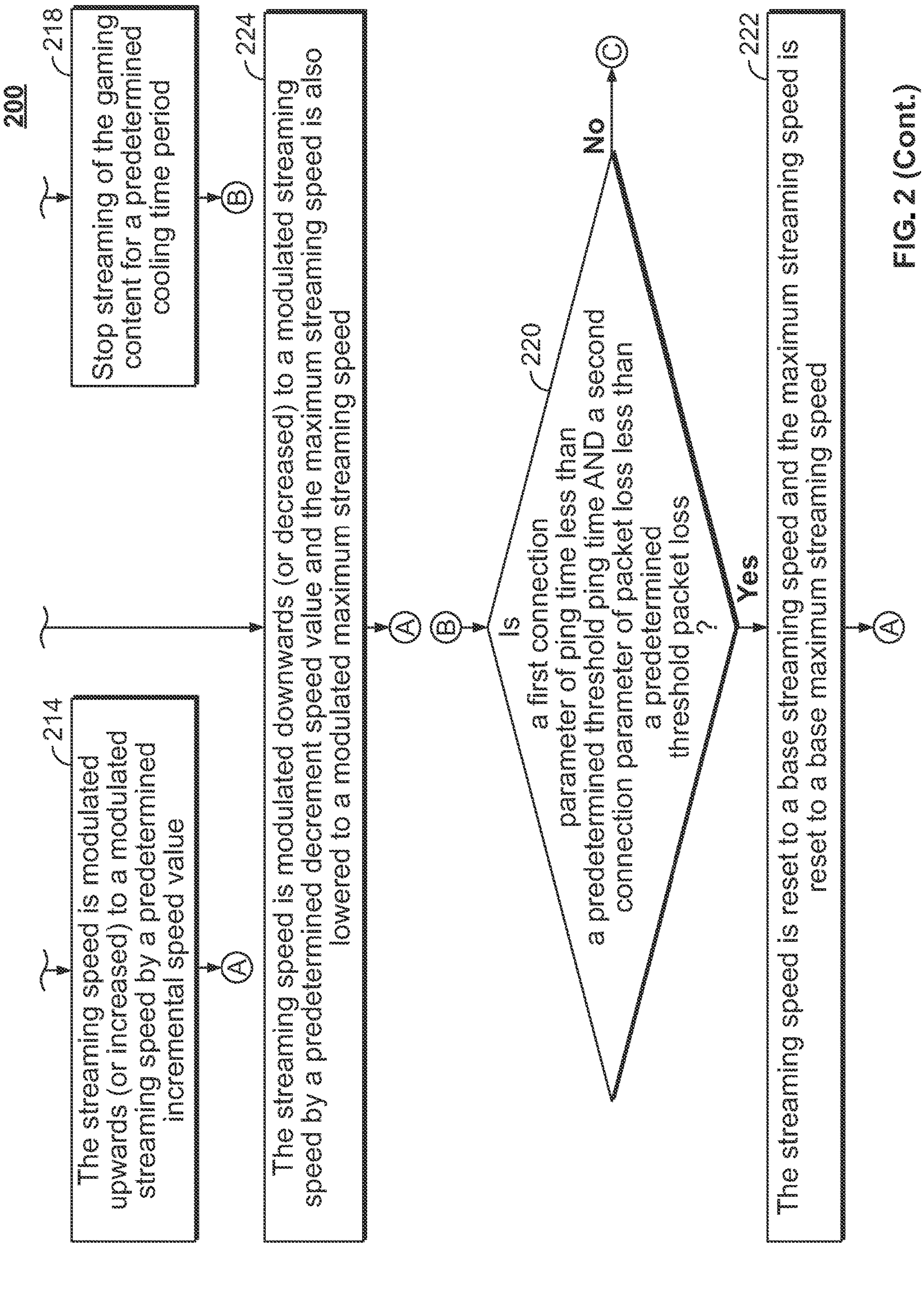

FIG. 2 is a flowchart of a plurality of exemplary steps of a method 200 of implementing adaptive or responsive gaming content streaming in a multi-player online gaming or massively multiplayer online gaming system/environment, in accordance with some embodiments of the present specification. Referring now to FIGS. 1 and 2, in various embodiments, the method 200 is implemented by the server-side ACS module 132 which is in data communication with the client-side ACS module 132'.

At step 202, based on a determined need for downloading gaming content in real-time during gameplay, the client-side ACS module 132' is configured to send a request to the server-side ACS module 132 to download the required gaming content. The need for downloading gaming content in real-time is driven from a player interacting with a portion of the gaming content, for example, an image that is not found in their base game package (provided to the player at the time of initial download, for example) or already downloaded in the CDN (Content Delivery Network) storage.

At step 204, based on the received request, the appropriately configured server-side ACS module 132 streams, in real-time, the required gaming content (to the client-side ACS module 132' which is configured to receive) at a predetermined streaming parameter(s)—that is, at a desired minimum streaming speed and an associated desired maximum streaming speed. In some embodiments, the desired streaming parameters correspond to predetermined, yet modifiable base streaming parameters that include a minimum streaming speed and a maximum streaming speed. In some embodiments, the base minimum streaming speed is 128 kbps and the base maximum streaming speed is 1500 kbps. However, in various other embodiments, the base minimum streaming speed and the base maximum streaming speed may be customized to other values. In some embodiments, the desired streaming parameters are set to the base streaming parameters at an initiation of a streaming session of the gaming content. In some embodiments, the desired streaming parameters correspond to modulated streaming parameters that are customized dynamically or in real-time based on the quality/stability of connection of the network 115 between the server-side and client-side ACS modules 132, 132'. The modulated streaming parameters include a modulated minimum streaming speed and a modulated maximum streaming speed.

At step 206, the server-side ACS module 132 is configured to determine if the time duration of streaming the gaming content is equal to a predefined threshold time duration. In some embodiments, the predefined threshold time duration is on the order of 400 to 600 milliseconds, preferably 425 to 575 milliseconds, preferably 450 to 550 milliseconds, and most preferably 500 milliseconds. The predefined threshold time duration may vary in alternate embodiments. If the time duration for streaming the gaming content is less than the predefined threshold time duration, the flow moves back to step 204, that is, the server-side ACS module 132 is configured to continue to stream the gaming content to the client-side ACS module 132' (or the client device 110).

However, if the time duration of streaming the gaming content is equal to the predefined threshold time duration, the flow proceeds to step 208. At step 208, the server-side ACS module 132 is configured to determine if the quality or stability of the network connection (between the server-side and client-side ACS modules 132, 132') is robust. In some embodiments, the quality or stability of the network connection is deemed as robust if the connection complies with a first connection parameter, a second connection parameter, and a third connection parameter, which may be ping time, packet loss, and amount of gaming content downloaded at the ACS module 132' during the predefined threshold time duration, respectively. Stated differently, on a continual basis, at the end of the predefined threshold time duration, the server-side ACS module 132 is configured to determine or evaluate the quality or stability of the network connection. In some embodiments, the amount of gaming content downloaded (that is, the third connection parameter) is determined cither by the player setting a GB limit per day, such as a 1 GB minimum with no maximum or the download limit set by the player's gaming console (such as, for example, 5 GB per 20 minutes for PS5® and 1 GB per 5 minutes for Xbox® Series X/S).

In some embodiments, the quality or stability of the network connection is considered robust if: a) the first connection parameter, specifically ping (Packet Internet or Inter-Network Groper) time, is less than a predefined threshold ping time. In some embodiments, the predefined ping time is 50 milliseconds. In some embodiments, an increase of 15% over the predefined threshold ping time is considered as a deterioration of the quality of the network connection (that is, a slowing down of the gaming CDN) and an increase of 50% is an immediate stopping of the CDN, b) the second connection parameter, specifically packet loss, is less than a predefined threshold packet loss. In some embodiments, the predefined threshold packet loss is 1%, 5%, 10%, 15%, 20%, 25%, 30% or any whole number increment between 1% and 30%, and c) the third connection parameter, which may be at least one of i) the amount of gaming content downloaded at the ACS module 132', being substantially equal to an amount of gaming content streamed (by the ACS module 132) at the streaming speed (of step 204) in the predefined threshold time duration or ii) the amount of gaming content downloaded at the ACS module 132' being substantially equal to a data size limit per day set by the player and/or the download limit set by the player's gaming console, such as 5 gigabytes per 20 minutes or 1 gigabyte per 5 minutes. If the above conditions for the first, second and third connection parameters are not met then the network connection is determined to be unstable and therefore not robust and vice versa.

If, at step 208, it is determined that the quality or stability of the network connection is robust, then the flow proceeds to step 210. At step 210, the server-side ACS module 132 is configured to check if the current streaming speed is equal to the maximum streaming speed. If yes, then the flow reverts to step 204. In other words, if the gaming content is being streamed at the maximum streaming speed, then streaming is continued without any further modulation of the streaming speed. In some embodiments, the maximum streaming speed is 1500 kbps. However, if the current streaming speed is less than the maximum streaming speed then, at step 214, the streaming speed is modulated upwards (or increased) to a modulated streaming speed. Thereafter, the flow moves back to step 204. In some embodiments, the streaming speed is increased by a predetermined incremental speed value. In some embodiments, the predetermined incremental speed value is, for example, 128 kbps. Thus, the streaming speed is increased incrementally by 128 kbps until the maximum streaming speed is achieved. In some embodiments, the maximum streaming speed may be the base maximum streaming speed or a modulated maximum streaming speed depending upon the quality or stability of the network connection. In various embodiments, the predetermined incremental speed value may be higher or lower than 128 kbps.

If, at step 208, it is determined that the quality or stability of the network connection is not robust (i.e. packet loss or an increase in latency from a small connection bandwidth), then the flow proceeds to step 216. A network connection may be determined to not be robust if a degree of data packet loss is above a predefined value, if a rate of increase in data packet loss is above a predefined value, if a degree of network latency is above a predefined value, and/or if a rate of increase in network latency is above a predefined value At step 216, the server-side ACS module 132 is configured to determine if the first and/or second connection parameters have degraded severely resulting in substantial degradation of quality or stability of the network connection. In some embodiments, the quality or stability of the network connection is determined to be substantially or severely degraded if one or both of the following conditions are met: a) the first connection parameter of ping time increases by more than X % of the predefined threshold ping time, b) the second connection parameter of packet loss increases by more than Y % of the predefined threshold packet loss. In some embodiments, X %=Y %=15%. However, in some embodiments, X %≠Y % and the values of X % and Y % may range from 10% to 25%.

If, at step 216, it is determined that the quality or stability of the network connection has substantially or severely degraded then the flow moves to step 218. At step 218, the server-side ACS module 132 is configured to stop streaming of the gaming content. In other words, the network connection is interrupted for a predetermined cooling off time-period. In some embodiments, the predetermined cooling time-period is 20 seconds. In some embodiments, the predetermined cooling time period ranges from 10 seconds to 30 seconds. In embodiments, the cooling-off period is employed so that the network pressure, congestion, and/or data transmission delays are reduced for an extended amount of time, resulting in improved network quality or stability.

At the end of the predetermined cooling time period, at step 220, the server-side ACS module 132 is configured to evaluate if the first connection parameter of ping time is less than the predetermined threshold ping time and the second connection parameter of packet loss is less than the predetermined threshold packet loss. In some embodiments, the evaluation of step 220 is performed over a predetermined evaluation time period. In some embodiments, the predetermined evaluation time period is 10 seconds. In some embodiments, the predetermined evaluation time period ranges from 5 seconds to 15 seconds.

At the end of the predetermined evaluation time period, if the first connection parameter and/or second connection parameters are found to be less than the respective predetermined threshold ping time and packet loss then, at step 222, the streaming speed is reset to the base minimum streaming speed and the maximum streaming speed is reset to the base maximum streaming speed. Thereafter, the flow moves back to step 204. However, if the first and/or second connection parameters are still found to be greater than the respective predetermined threshold ping time and packet loss then the flow moves back to step 218.

On the other hand, if, at step 216, it is determined that the quality or stability of the network connection has not degraded substantially or severely then the flow proceeds to step 224. That is, the flow proceeds to step 224 if a) at step 208, it is determined that the quality or stability of the network connection is not robust (or has degraded) and b) at step 216, it is determined that the quality or stability of the network connection has not degraded substantially or severely. Stated differently, the flow moves to step 224 if the first connection parameter of ping time increases more than the predefined threshold ping time but does not increase by more than X % of the predefined threshold ping time, the second connection parameter of packet loss increases more than the predefined threshold packet loss but does not increase by more than Y % of the predefined threshold packet loss and the third connection parameter of the amount of gaming content downloaded at the ACS module 132' is substantially less than the amount of the content streamed by the ACS module 132. In some embodiments, substantially less is defined as being less than 99% of the amount of the content streamed by the ACS module 132.

At step 224, the streaming speed is modulated downward (or decreased/reduced) to a modulated streaming speed and the maximum streaming speed is also lowered by a predefined lower value to a modulated maximum streaming speed. In some embodiments, the predefined lower value is 256 KB/sec that may be successively applied. For example, if the streaming speed is 1200 KB/sec and a network connection issue is detected then the streaming speed is reduced to 950 KB/sec (or a reduction by 256 KB/sec). If the connection still does not stabilize then the streaming speed is further reduced to 700 KB/sec (that is, a further reduction of 256 KB/sec) and so forth until the connection stabilizes or the streaming speed reaches 0 (that is, the content streaming is stopped). Thereafter, the flow moves back to step 204. In some embodiments, the streaming speed is decreased by a predetermined decrement speed value. In some embodiments, the predetermined decrement speed value is, say, 256 kbps. Thus, the streaming speed is decremented in steps of 256 kbps until the network connection is determined to be stable. In various embodiments, the predetermined decrement speed value may be higher or lower than 256 kbps.

The above examples are merely illustrative of the many applications of the systems and methods of the present specification. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

What is claimed is:

1. A system for dynamically adapting a streaming of content during a video gameplay session in a multi-player gaming network, wherein the multi-player gaming network comprises at least one host computer, a plurality of client devices in data communication with the at least one host computer and located remote from each other, wherein each of the plurality of client devices is configured to execute the video gameplay session, a first game module configured to execute in the at least one host computer, and a second game module configured to execute in each of the plurality of client devices, and wherein, upon execution, the first and second game modules are programmed to:

transmit, by the second game module of one of the plurality of client devices to the first game module, a request to download the content during the gameplay session, wherein a maximum streaming speed is associated with at least one of the content and said transmission;

stream, by the first game module to the second game module in response to the request, the content at a streaming speed that is less than the maximum streaming speed, wherein the content is streamed for a first time duration;

determine, by the first game module at an end of the first time duration, a first level of stability of a network connection between the first and second game modules, wherein the first level of stability is determined based on at least one of a first connection parameter, a second connection parameter or a third connection parameter;

increase the streaming speed, by the first game module if the network connection is determined to be stable, in a plurality of incremental steps until the maximum streaming speed is achieved, wherein each of the plurality of incremental steps increases the streaming speed; and determine, by the first game module whether the network connection has a first level of instability, wherein, if the network is determined to have the first level of instability, stop the streaming of the content for a predetermined time period and subsequently restart the streaming of the content by the first game module after the predetermined time period if the network connection is determined to have a second level of stability.

2. The system of claim 1, wherein the streaming speed is 128 kbps, and the maximum streaming speed is 1500 kbps.

3. The system of claim 1, wherein the first time duration is 500 milliseconds.

4. The system of claim 1, wherein the first connection parameter is indicative of a ping time, the second connection parameter is indicative of a packet loss and the third connection parameter is indicative of an amount of the content downloaded in the second game module.

5. The system of claim 1, wherein the network connection is determined to have the first level of stability if the first connection parameter is less than a predetermined threshold ping time, the second connection parameter is less than a predetermined threshold packet loss and the third connection parameter is substantially equal to an amount of the content streamed by the first game module at the streaming speed during the first time duration.

6. The system of claim 1, wherein the network connection is determined to have the second level of stability if the first connection parameter is less than a predetermined threshold ping time and the second connection parameter is less than a predetermined threshold packet loss.

7. The system of claim 1, wherein the network connection is determined to have the first level of instability if the first connection parameter increases more than a predetermined threshold ping time but does not increase by more than 15% of the predetermined threshold ping time, the second connection parameter increases more than a predetermined threshold packet loss but does not increase by more than 15% of the predetermined threshold packet loss and the third connection parameter is substantially less than an amount of the content streamed by the first game module at the streaming speed during the first time duration.

8. The system of claim 1, wherein the network connection is determined to have a second level of instability if the first connection parameter increases more than 15% of the predetermined threshold ping time, and the second connection parameter increases more than 15% of the predetermined threshold packet loss.

9. The system of claim 1, wherein, while increasing the streaming speed, the first and second game modules are further programmed to periodically determine, by the first game module the second level of stability of the network connection between the first and second game modules, wherein the second level of stability is determined based on at least the first connection parameter, the second connection parameter or the third connection parameter.

10. The system of claim 8, wherein the predetermined threshold ping time is 50 milliseconds and the predetermined threshold packet loss is 1%.

11. A computer readable non-transitory medium comprising a plurality of executable programmatic instructions wherein, when said plurality of executable programmatic instructions are executed by a processor in a computing device, a process for dynamically adapting streaming of content during a video gameplay session in a multi-player gaming network is executed, wherein the process for dynamically adapting streaming of content is executed at least partially by at least one host computer in data communication with a plurality of remotely located client devices, the plurality of executable programmatic instructions comprising:

transmitting, by one of the plurality of client devices to the at least one host computer, a request to download the content during the gameplay session;

streaming, by the at least one host computer to said one of the plurality of client devices, the content at a streaming speed and an associated maximum streaming speed, wherein the content is streamed for a first time duration;

determining, by the at least one host computer at an end of the first time duration, a first level of stability of a network connection between the at least one host computer and said one of the plurality of client devices on the multi-player gaming network, wherein the first level of stability is determined based on at least one of a first connection parameter, a second connection parameter and a third connection parameters; and increasing the streaming speed, by the at least one host computer if the network connection is determined to be stable, in a plurality of incremental steps till the maximum streaming speed is achieved, wherein each of the plurality of steps increases the streaming speed; and determining, by the at least one host computer whether the network connection has a first level of instability, wherein, if the network connection is determined to have the first level of instability, stopping the streaming of the content for a predetermined time period and subsequently restarting the streaming of the content after the predetermined time period if the network connection is determined to have a second level of stability.

12. The computer readable non-transitory medium of claim 11, wherein the streaming speed is 128 kbps, and the maximum streaming speed is 1500 kbps.

13. The computer readable non-transitory medium of claim 11, wherein the first time duration is 500 milliseconds.

14. The computer readable non-transitory medium of claim 11, wherein the first connection parameter is indicative of a ping time, the second connection parameter is indicative of a packet loss and the third connection parameter is indicative of an amount of the content downloaded in said one of the plurality of client devices.

15. The computer readable non-transitory medium of claim 14, wherein the network connection is determined to have the first level of stability if the first connection parameter is less than a predetermined threshold ping time, the second connection parameter is less than a predetermined threshold packet loss and the third connection parameter is substantially equal to an amount of the content streamed by the at least one host computer at the streaming speed during the first time duration.

16. The computer readable non-transitory medium of claim 14, wherein the network connection is determined to have the second level of stability if the first connection parameter is less than a predetermined threshold ping time and the second connection parameter is less than a predetermined threshold packet loss.

17. The computer readable non-transitory medium of claim 14, wherein the network connection is determined to have the first level of instability if the first connection parameter increases more than a predetermined threshold ping time but does not increase by more than 15% of the predetermined threshold ping time, the second connection parameter increases more than a predetermined threshold packet loss but does not increase by more than 15% of the predetermined threshold packet loss and the third connection parameter is substantially less than an amount of the content streamed by the at least one host computer at the streaming speed during the first time duration.

18. The computer readable non-transitory medium of claim 14, wherein the network connection is determined to have the second level of instability if the first connection parameter increases more than 15% of the predetermined threshold ping time, and the second connection parameter increases more than 15% of the predetermined threshold packet loss.

19. A computer-implemented method for dynamically adapting streaming of content during a video gameplay session in a multi-player gaming network, wherein the multi-player gaming network comprises at least one host computer and a plurality of client devices in data communication and located remote from each other, wherein each of the plurality of client devices is configured to execute the video gameplay session, and wherein a first game module is stored in the at least one host computer and a second game module is stored in each of the plurality of client devices, the method being executed by the first and second game modules and comprising:

transmitting, by the second game module of one of the plurality of client devices to the first game module, a request to download the content during the gameplay session;

streaming, by the first game module to the second game module in response to the request, the content at a streaming speed and an associated maximum streaming speed, wherein the content is streamed for a predefined threshold time duration;

determining, by the first game module at an end of the predefined threshold time duration, a first level of stability of a network connection between the first and second game modules on the multi-player gaming network, wherein the first level of stability is determined based on a first connection parameter, a second connection parameter and a third connection parameters;

increasing the streaming speed, by the first game module if the network connection is determined to be stable, in a plurality of steps of a predetermined incremental speed value till the maximum streaming speed is achieved, wherein each of the plurality of steps has a corresponding increased streaming speed at which the content is streamed for the predefined threshold time duration, and wherein a consecutive next of the plurality of steps is implemented only if the network connection is determined to have the first level of stability at an end of the predefined threshold time duration of an immediate previous of the plurality of steps;

decreasing the streaming speed, by the first game module if the network connection is determined to have a first level of instability, in a plurality of steps of a predetermined decrement speed value till the network connection is determined to be stable, wherein each of the plurality of steps has a corresponding decreased streaming speed at which the content is streamed for the predefined threshold time duration, and wherein a consecutive next of the plurality of steps is implemented only if the network connection is determined to have the first level of instability at an end of the predefined threshold time duration of an immediate previous of the plurality of steps;

stopping streaming of the content, by the first game module if the network connection is determined to have a second level of instability, for a predetermined cooling time period;

determining, by the first game module at an end of the predefined cooling time period and over a predetermined evaluation time period, a second level of stability of the network connection based on the first and second connection parameters; and restarting streaming of the content, by the first game module, if the network connection is determined to have the second level of stability at the end of the predetermined evaluation time period, wherein streaming of the content is restarted at the streaming speed or the maximum streaming speed.

20. The computer-implemented method of claim 19, wherein the streaming speed is 128 kbps, and the maximum streaming speed is 1500 kbps.

21. The computer-implemented method of claim 19, wherein the predefined threshold time duration is 500 milliseconds.

22. The computer-implemented method of claim 19, wherein the first connection parameter is indicative of a ping time, the second connection parameter is indicative of a packet loss and the third connection parameter is indicative of an amount of the content downloaded in the second game module.

23. The computer-implemented method of claim 22, wherein the network connection is determined to have the first level of stability if the first connection parameter is less than a predetermined threshold ping time, the second connection parameter is less than a predetermined threshold packet loss and the third connection parameter is substantially equal to an amount of the content streamed by the first game module at the streaming speed during the predefined threshold time duration.

24. The computer-implemented method of claim 22, wherein the network connection is determined to have the second level of stability if the first connection parameter is less than a predetermined threshold ping time and the second connection parameter is less than a predetermined threshold packet loss.

25. The computer-implemented method of claim 22, wherein the network connection is determined to have the first level of instability if the first connection parameter increases more than a predetermined threshold ping time but does not increase by more than 15% of the predetermined threshold ping time, the second connection parameter increases more than a predetermined threshold packet loss but does not increase by more than 15% of the predetermined threshold packet loss and the third connection parameter is substantially less than an amount of the content streamed by the first game module at the streaming speed during the predefined threshold time duration.

26. The computer-implemented method of claim 22, wherein the network connection is determined to have the second level of instability if the first connection parameter increases more than 15% of the predetermined threshold ping time, and the second connection parameter increases more than 15% of the predetermined threshold packet loss.

27. The computer-implemented method of claim 26, wherein the predetermined threshold ping time is 50 milliseconds and the predetermined threshold packet loss is 1%.

* * * * *